US006721796B1

(12) United States Patent
Wong

(10) Patent No.: US 6,721,796 B1
(45) Date of Patent: *Apr. 13, 2004

(54) HIERARCHICAL DYNAMIC BUFFER MANAGEMENT SYSTEM AND METHOD

(75) Inventor: Michael K. Wong, San Mateo, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,869

(22) Filed: Jul. 22, 1999

(51) Int. Cl.[7] ............................................... G06F 15/16
(52) U.S. Cl. ...................... 709/232; 709/234; 709/235; 370/395.4; 370/395.7; 370/412; 370/413; 370/415; 370/417
(58) Field of Search ................................. 709/232–235; 370/395.4–395.7, 395.71, 395.72, 412–417

(56) References Cited

U.S. PATENT DOCUMENTS

| 5,541,912 A | * | 7/1996 | Choudhury et al. | ........... 370/17 |
| 6,018,527 A | * | 1/2000 | Yin et al. | .................... 370/412 |
| 6,219,728 B1 | * | 4/2001 | Yin | .............................. 710/52 |
| 6,249,359 B1 | * | 6/2001 | Aoki et al. | .................. 358/473 |

OTHER PUBLICATIONS

"Circular Dat Buffers with Fast Bypass Path," IBM Technical Disclosure Bulletin, vol. 37, pp. 15–16, Apr. 1, 1994.*
"Ram–Based Packet Switch With Overflow Buffers," IBM Technical Disclosure Bulletin, vol. 32, pp. 308–310, Jan. 1, 1990.*
Floyd, Sally and Jacobson, Van. Random Early Detection Gateways for Congestion Avoidance. IEEE/ACM Transactions on networking, Aug. 1993.
Lin, Dong and Morris, Robert. Dynamics of Random Early Detection SIGcom. 1997, pp. 1–11.
Choudhury, Abhijit K. and Hahne, Ellen L. Dynamic Queue Length Thresholds in a Shared Memory ATM Switch. IEEE, 1996, (679–687 pgs.).

* cited by examiner

Primary Examiner—Meng-Al T. An
Assistant Examiner—Jinsong Hu
(74) Attorney, Agent, or Firm—Campbell Stephenson Ascolese LLP

(57) ABSTRACT

Multi-level buffer system dynamically allocates storage for data units arriving at network gateway, and retrieves stored data units according to hierarchical schedule. Minimum and maximum thresholds associated with system resource and storage availability determine acceptance and storage of data units. Data units are accepted preferably if all threshold criteria are met. Threshold criteria may be determined from reserved minimum buffer length, calculated maximum buffer length, or random early discard-type algorithm applied separately to each buffer level. Optionally, buffer management applies to non-hierarchical storage systems.

20 Claims, 1 Drawing Sheet

HIERARCHICAL DYNAMIC BUFFER MANAGEMENT SYSTEM AND METHOD

FIELD OF INVENTION

Invention relates to electronic storage, particularly to hierarchical buffer systems.

BACKGROUND OF INVENTION

Conventional digital electronics systems employ various storage structures, including buffers, queues, caches, or other similar memory devices. More recently, especially for distributed networking and applications, such as those applications for enabling high-speed transmission, processing, and storage of so-called Internet or related digital data or signaling traffic, buffers and similar electronic repositories are increasingly used as temporary storage, for example, to avoid or otherwise manage congestion of traffic flow of packets, cells, frames or other data units through a network gateway.

Various approaches are used to police gateway queuing of traffic load at given times. In particular, with buffer structures being used to hold temporary excess traffic load at a gateway, numerous buffer management algorithms are proposed, such as last packet discard (i.e., "drop tail" approach), randomization (i.e., "early random drop" (ERD), "random early detection" (RED), "flow random early drop" (FRED)), as discussed in further detail in references cited in this patent application, which are hereby incorporated by reference as appropriate.

However, such present approaches are limited in optimizing data throughput and maintaining fairness amongst different flows, particularly for processing arriving data units for allocation in hierarchical buffer systems. Accordingly, an improved solution is required to optimize data throughput and storage.

SUMMARY OF INVENTION

Invention resides in a multi-level buffer system and/or method for managing buffer resources to reduce or eliminate network congestion, particularly by dynamically allocating storage resources to arriving data units according to hierarchical acceptance criteria. Moreover, stored data units are retrievable according to hierarchical schedule.

Acceptance criteria may comprise minimum and/or maximum threshold values, which are pre-specified or dynamically computed, and may be determined from system resource and storage availability. Data units are accepted for allocated buffer storage upon dynamically-determined satisfaction of certain hierarchically-based acceptance criteria. Such criteria may be determined from reserved minimum buffer length, calculated maximum buffer length, or random early discard-type algorithm applied separately to each buffer level.

DETAILED DESCRIPTION OF PREFERRED EMBODIMENTS

Figure 1A:
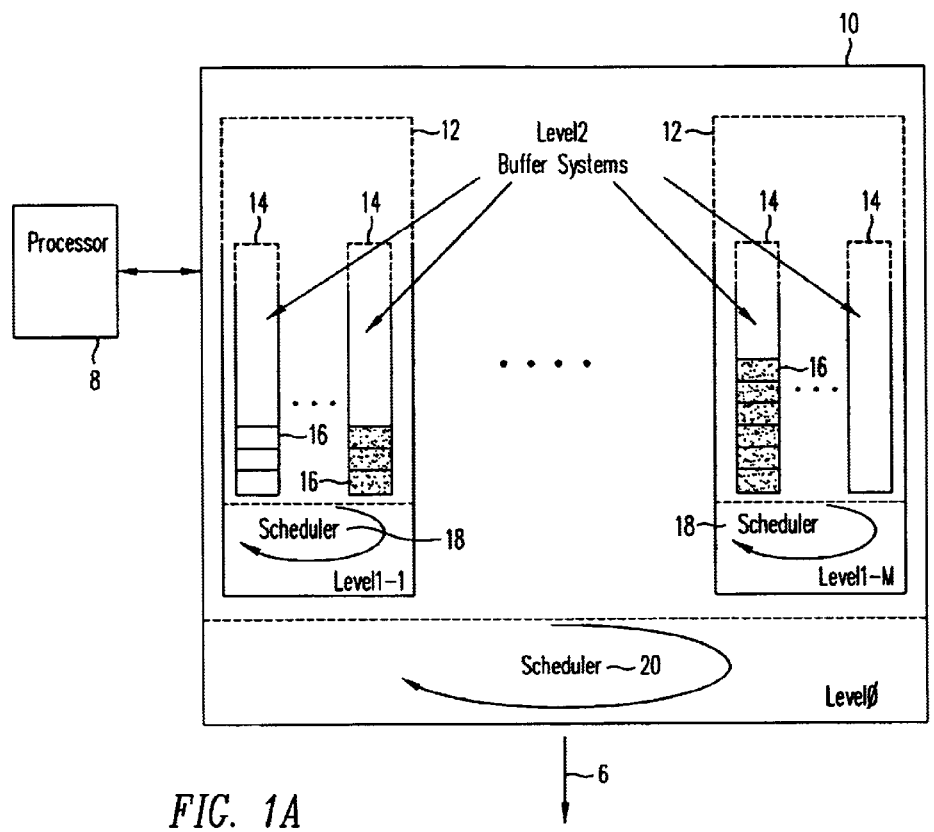
FIG. 1A is a general system block diagram of a hierarchical buffer system for implementing a preferred embodiment of the present invention.

Generally, a preferred implementation accomplishes dynamic hierarchical or non-hierarchical buffering and management thereof using multiple-level buffer, queue, or similar digital repository sub-systems, each such buffer system being assigned or otherwise associated with certain predetermined or dynamically calculated acceptance criteria, such as minimum and/or maximum threshold values for accepting one or more data units, such as packets, cells, frames, or other network-transmitted or accessible digital signals, arriving from or through a network gateway, port, or other network-coupled node.

Additionally, a processor, computer, controller, logic circuit, software program application, or other electronically programmable device, state machine, or equivalent functional module is provided for dynamically managing one or more buffers for storing and/or retrieving one or more arriving data units in single or multi-level buffer subsystems or systems. Preferably, each arriving data unit is stored once in the buffer system, but associated with one or more hierarchical or modular levels, as described herein.

Such processor functionality may serve to execute instructions or cause to determine acceptance criteria for an arriving data unit and/or its corresponding hierarchical or modular level or queue according to one or more predetermined or dynamically calculated values, which represent certain buffer system resources or conditions, such as system loading or available storage, preferably respectively for each hierarchy level or queue.

Additionally, the processor may execute instructions or cause to retrieve separately one or more data units from certain level buffer locations, preferably according to a modular or hierarchically-based schedule. In such retrieval manner, the processor may execute instructions or cause to generate separate traffic flows over different data paths or links as well as different or overlapping times, as appropriate to optimize data processing and reduce network congestion.

Preferably, in one embodiment of the present invention, arriving data unit(s) are preferably stored once in the buffer system, being accepted and accessible for available storage allocation in different queues or buffer subsystems only when each and all level acceptance criteria or specified thresholds are determined by the processor to be satisfied.

Hence, to enable operation of a preferred embodiment for dynamically buffering arriving data units, a network gateway such as a router, switch, or other interconnect port is accessible to a level N repository associated with minimum and/or maximum thresholds, and a next-hierarchically higher or lower level N+1 repository associated with minimum and/or maximum thresholds. Levels N, N+1 may be non-hierarchically related.

Then, one or more data units arrive or is electronically accessible at the network gateway for data or signal processing such received data unit(s) by a programmed processor, controller, computer, or other functionally equivalent logic circuit, state machine, or executable software code.

Preferably, acceptance criteria are pre-specified or dynamically determined to allocate certain buffer storage locations to arriving data unit(s). For example, minimum and/or maximum threshold values are provided by a processor for the level N repository and/or the level N+1 repository, such that buffer storage locations in the level N repository and/or the level N+1 repository are allocated to one or more received data units.

Optionally, such provided minimum and maximum threshold values for level N and/or level N+1 repositor(ies) are predetermined or calculated dynamically by the processor according to prior, current, and/or expected system loading or availability of the level N and/or level N+1 repositories.

As specified in further detail herein, acceptance criteria may be determined by calculating a buffer length associated with arriving data unit(s) or its/their corresponding hierarchical level or queue. In particular, a data unit is always accepted if the buffer length is less than a minimum value. This requires a minimum number of buffer locations to be reserved. To accept the data unit into the non-reserved locations, the buffer length has to be less than a dynamic maximum buffer length ($b_{max\ i}$) substantially according to the following formula:

$$b_{max\ i} = b_{min\ i} + \alpha_i F(FB)$$

where: $b_{min\ i}$ represents a minimum reserved buffer length,

FB represents a free storage size, $\alpha_i$ represents a number of non-negative values less than or equal to 1, and F represents a function for sharing free storage size.

In general, F may be any non-negative, non-decreasing functions.

Moreover, as specified in further detail herein, acceptance criteria may be determined by applying a random early discard (RED)-type calculation to the buffer systems at one or more levels.

Upon satisfying the acceptance criteria and the allocation of buffer storage locations to certain arriving data units, then, the data units are accordingly stored in the allocated locations. Each data unit may be stored once in the overall buffer system, but accessible or associated with multiple modular or hierarchy levels.

Subsequently, such stored data units may be retrieved by the processor, preferably according to a hierarchical retrieval schedule. In such hierarchical manner, the processor may execute instructions or otherwise cause the generation of hierarchically-based traffic flows, e.g., where certain retrieved data unit is transmitted as part of a digital stream or network traffic flow which is associated with one or more hierarchical level or queue.

Referring to FIG. 1A general system block diagram, hierarchical buffer system 10 is shown, preferably cooperating functionally with one or more processor, computer, or controller 8, having digital memory for storing executable programs or other data files. Hierarchical buffer system 10 couples 6 to one or more network gateways or other accessible port for receiving, sending, or otherwise communicating to access certain digital data units or signals for processing, storage, or temporary buffer management and congestion avoidance as specified herein.

Hierarchical or modular buffer system 10 may include one or more levels or queues corresponding to one or more hierarchical levels or functional partitions. Here, three levels 10, 12, 14 are shown, whereby level 0 10 represents a complete, general buffer system. Generally, level N system may include one or more schedulers 18, 20 and a number of level N+1 buffer systems or subsystems, which are managed by scheduling software or circuit logic. If N equals the top level, then the buffer system does not necessarily employ a scheduler, and data may be stored in a First-In-First-Out (FIFO)-type queue.

In such a hierarchical or modular configuration, one or more storage systems may be configured, for example, with N levels of buffers. Hence, a buffer system at level-i, for instance, may be included in one buffer system at level i−1, for i between 1 and N inclusively. Furthermore, a level-k buffer system may contain one or more level k+1 buffer system. Preferably, buffer assignments are configurable. Note that level-0 refers to the entire storage system.

Data units, either as an Internet Protocol (IP) packet, Asynchronous Transfer Mode (ATM) cell, or frame, are stored preferably only once in the entire buffer system 10. Level N scheduler decides from which level N+1 buffer system to retrieve the data unit for transmission. If N+1 is not the highest level buffer system, then the level N+1 scheduler within a selected buffer system decides among its buffer subsystems from which to retrieve data unit(s).

The foregoing hierarchical buffer management process is repeatable until the highest level buffer is reached. Then, the data unit at the head of the queue is retrieved and transmitted out of the buffer system. Buffer length information of each buffer system is maintained in storage. Preferably, the following formula applies for determining buffer length:

$$B_N^i = \Sigma_k B_{N+1}^k, k \in S_N^i$$

where: $B_N^i$ represents queue length of "i-th" buffer system at level "N"; and $S_N^i$ represents the set of level N+1 buffer system in the i-th level N buffer system.

In one implementation of the preferred embodiment, a so-called dynamic maximum with minimum reservation (DMMR) scheme may be employed to improve on congestion avoidance. To guarantee that the data loss probability is less than a specified level, and to isolate interaction from different streams of data units, a buffer system may reserve minimum and set maximum with each buffer system. A fixed minimum is generally sufficient to guarantee minimal quality requirements. However, a fixed maximum may penalize the buffer management system unnecessarily, while other flows may not be using the buffer system. Thus, a dynamic maximum approach is preferred.

Regarding single buffer systems, storage is allocated generally when buffer systems at all selected levels accept data unit(s). Storage is allocated if buffer length $b_{len\ i}$ is less than reserved minimum, $b_{min\ i}$ irrespective of system loading. When buffer length is larger than minimum, then storage is allocated only if buffer length is less than dynamic maximum, $b_{max\ i}$. The following formula is used to calculate dynamic maximum buffer usage of each buffer system:

$$b_{max\ i} = b_{min\ i} + \alpha_i F(FB)$$

where $b_{min\ i}$ represents a minimum reserved buffer length,

FB represents a free storage size, $\alpha_i$ represents a number of non-negative values less than or equal to 1, and F represents a function for sharing free storage size.

In general, F may be any non-negative, non-decreasing function(s).

Note that identity function may be used for F. In this case, value of $\alpha_i$ is used to weight different traffic classes. In systems with a small number of buffer systems, such assumptions are sufficient. But a traffic class with a smaller $\alpha_i$ may be penalized, even when the system is lightly loaded. Such inefficiency is apparent when the system has a large number of queues. Here, the range of $\alpha_i$ values is chosen to be relatively small to bound per-buffer system maximum. Note that despite free buffers being available, low-priority class traffic may be discarded unnecessarily. Since $\alpha_i$ typically has a relatively coarse range, it may be insufficient to support prioritizing traffic classes and a large number of queues.

Figure 1B:
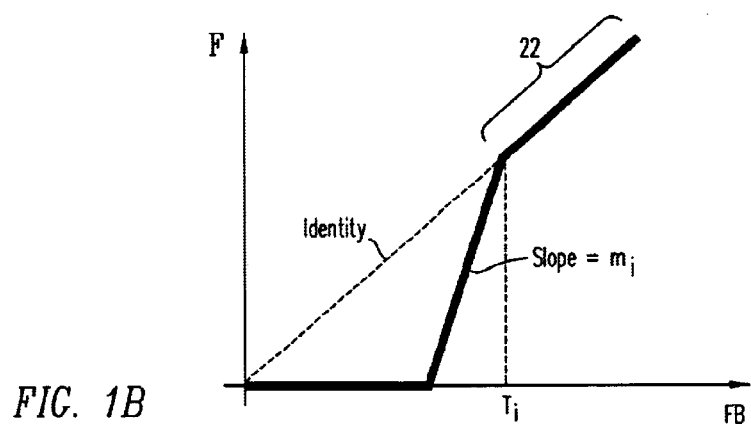
FIG. 1B is a diagram for illustrating functional aspects of the present invention.

For illustration, the following function serves to improve performance over the identity function. FIG. 1B illustrates functional aspects. Two, parameters characterize F:

threshold, $T_j$, and slope $m_j$. Together with the $\alpha_i$ parameter, the dynamic maximum is determined as follows: choose the value of $\alpha_i$ to bound maximum for group of buffer systems, and individual ($T_j$, $m_j$) values for different buffer systems within the group. Hence, the larger the value of both ($T_j$, $m_j$), then the lower priority of a class. If free storage is larger than, say maximum $T_j$, all classes are treated equally. As free storage size decreases, different classes are affected differently. If threshold $T_j$ is zero, the function reduces to the identify function. Note on identity portion 22 of diagram curve, essentially no users of the buffer system are penalized.

Following logical steps generally illustrate preferred methodology for implementing DMMR algorithm described herein:

1. Data unit (e.g., packet or cell) arrives at buffer or storage system with N buffer levels and is classified to be stored in buffer sequence, $b_N$, $b_{N-1}$, $b_{N-2}$, ..., $b_1$, $b_0$. Note: $b_i$ is contained in $b_{i-1}$, for i between N and 1; and $b_0$ represents entire storage system.
2. For each buffer system $b_i$,
3. If buffer length of $b_i$ is less than associated minimum, then buffer system $b_i$ can accept packet or cell, else,
4. If buffer length of is less than dynamic maximum, then buffer system $b_i$ can accept packet or cell, else,
5. Buffer system $b_i$, cannot accept packet or cell.
6. If all buffer systems $b_N$, $b_{N-1}$, $b_{N-2}$, ..., $b_1$, $b_0$ can accept packet or cell, then packet or cell is accepted to storage system.

Preferably, dynamic maximum is calculated as follows:

$$b_{max\ i} = b_{min\ i} + \alpha_i F(FB)$$

where $b_{min\ i}$ represents a minimum buffer length,

FB represents a free storage size, $\alpha_i$ represents a number of non-negative values less than or equal to 1, and F represents a function for sharing free storage size.
(F function sample is shown in FIG. 1B.)

In another implementation of the preferred embodiment, a so-called queue-protected random early discard (QRED) scheme may be employed to improve further on congestion avoidance. This algorithm applies to multi-level buffer system described herein.

Generally, conventional RED algorithm does not depend on particular scheduling scheme used, and serves as an admission control mechanism. According to RED algorithm, average buffer length ($b_{ave}$) is measured. If $b_{ave}$ is below minimum, $\min_{th}$, then packet is accepted. If packet is above maximum, $\max_{th}$, then packet is discarded. When $b_{ave}$ is between ($\min_{th}$, $\max_{th}$), packet is discarded according to a probability $P_b$, where:

$$p_b = \max_p[(q_{ave} - \min_{th})/(\max_{th} - \min_{th})]$$

and $\max_p$ is the maximum drop probability. This scheme introduces randomness into buffer system and de-synchronizes different network data sources. However, conventional RED approach is insufficient to protect weak flows, i.e., sources that do not send data often, and isolate aggressive sources. Furthermore, other conventional approach Flow RED (FRED) is also insufficient and achieves flow level isolation by performing flow detection and packet counting, which is a costly process.

A preferred embodiment supports flow level protection by providing the hierarchical buffer system described herein, whereby traffic is isolated and the RED technique may be applied at each hierarchy level or queue. Hence, in the multi-level hierarchical buffer system described earlier, the total number of higher level buffer systems may be large, whereas lower level buffer systems may be much smaller. If the RED algorithm is maintained separately at all levels, then a large number of buffer averages is maintained.

For general RED calculation, if average queue length value is determined to be between specified minimum and maximum values, then received packet is discarded with given probability. Also, if such average value is determined to be less than minimum value, then received packet is admitted. But, if such average value is determined to be larger than maximum value, then received packet may be discarded.

Following describes 3-level buffer system (i.e., level 0, 1, and 2); however, technique applies to buffer system with more levels. Preferred algorithm applies averaging technique on level 1 buffer systems. Dynamic maximum threshold computation described earlier may be applied to multi-level buffer system described herein. Such maximum may be fixed or dynamic. Averages on all level-1 buffer lengths are maintained. Threshold, $T_{L2}{}^i$, is specified for all level 2 buffer system i.

When data unit arrives for possible admission to i-th level 2 buffer system, RED separately applies, preferably under following conditions:

1. If average buffer length of level 1 buffer system that i-th level 2 buffer system belongs is larger than RED minimum threshold; and
2. Instantaneous buffer length of i-th level 2 buffer system is larger than $T_{L2}{}^1$.

If instantaneous buffer length of i-th level 2 buffer system is larger than computed dynamic maximum of level 2 i-th buffer system or instantaneous buffer length of level 1 buffer system which i-th level 2 buffer system belongs to is larger than dynamic maximum of level 1 buffer system, then data unit is discarded. Dynamic maximum may be set as fixed or calculated dynamically.

Present improved algorithm offers protection on level 2 buffer system, but without average calculation. Since dynamic maximum is calculated in fixed or variable manner and available at level 2 buffer systems, aggressive source usage is also limited.

Following logical steps generally illustrate preferred methodology for implementing QRED algorithm for buffer storage system with 3 buffer levels described herein:

1. Time average of buffer length of $b_1$ is computed.
2. Data unit (e.g., packet or cell) arrives at storage system with 3 buffer levels, and classified into buffer sequence, $b_2$, $b_1$, $b_0$. Note: $b_2$ is contained in $b_1$, and $b_0$ represents entire storage system.
3. If buffer length of $b_2$ is less than associated minimum threshold, then random early discard (RED) is not triggered, else,
4. If buffer length of $b_2$ is larger than dynamic maximum, then discard packet or cell, else,
5. If instantaneous buffer length of $b_1$ is larger than dynamic (or fixed) maximum, then discard packet or cell, else,
6. Activate RED computation:
7. If average buffer length of $b_1$ is below minimum, $\min_{th}$, then packet is accepted. If packet is above maximum, $\max_{th}$, then packet is discarded. When average buffer length of $b_1$ is between ($\min_{th}$, $\max_{th}$), packet is discarded according to probability $p_b$, where:

$$p_b = \max_p[(q_{ave} - \min_{th})/(\max_{th} - \min_{th})]$$

and $\max_p$ is maximum drop probability.

Preferably, dynamic maximum is calculated as follows:

$$b_{max\ i} = b_{min\ i} + \alpha_i F(FB) \qquad 5$$

where $b_{min\ i}$ represents a minimum buffer length,

FB represents a free storage size, $\alpha_i$ represents a number of non-negative values less than or equal to 1, and F represents a function for sharing free storage size.
(F function sample is shown in FIG. 1B.)

Note that preferred QRED calculation procedure applies to hierarchical queuing structure, as described herein. For example, in 2-level system, if queue length in designated high level is determined to be less than specified threshold, then received packet is accepted. Otherwise, RED applicability depends on designated low-level queue average.

Foregoing described embodiments of the invention are provided as illustrations and descriptions. They are not intended to limit the invention to precise form described. In particular, Applicant contemplates that functional implementation of invention described herein may be implemented equivalently in hardware, software, firmware, and/or other available functional components or building blocks. Other variations and non-hierarchical embodiments are possible in light of above teachings, and it is thus intended that the scope of invention not be limited by this Detailed Description, but rather by Claims following.

What is claimed is:

1. Hierarchical buffering apparatus comprising:
    a first-level hierarchical buffer system having one ore more first-level thresholds for accepting in a first-level buffer a first data unit arriving from a network gateway;
    a second-level hierarchical buffer system having one or more second-level thresholds for accepting in a second-level buffer the first data unit arriving from the network gateway; and
    a processor for dynamically managing storage of one or more arriving data units in the first-level and second-level hierarchical buffer systems, wherein at least one of the one or more first-level thresholds is less than at least one of the one or more second-level thresholds, and wherein a value of at least one of the one or more first-level thresholds and the one or more second-level thresholds is dynamically determined by the processor according to at least one of a prior system loading, a current system loading, and an expected system loading.

2. The buffering apparatus of claim 1 wherein:
    the first-level threshold comprises a first-level minimum threshold and a firs-level maximum threshold; and
    the second-level threshold comprises a second-level minimum threshold and a second-level maximum threshold.

3. The buffering apparatus of claim 1 wherein:
    the first-level or second-level threshold is determined by the processor according to a value representing system loading or available storage respectively for the first-level or second-level buffer system.

4. The buffering apparatus of claim 1 wherein:
    the processor retrieves the first data unit from the first-level or the second-level hierarchical buffer system according to a hierarchically-based schedule to generate separately a first-level traffic flow and a second-level traffic flow, the first-level data unit being stored once in any level buffer system.

5. The buffering apparatus of claim 1 wherein:
    the processor stores or retrieves the first data unit in the first-level or second-level hierarchical buffer system respectively according to a first-level schedule or a second-level schedule.

6. The buffering apparatus of claim 1 wherein:
    the first data unit is accepted respectively in the first-level or second-level hierarchical buffer when each of the first-level and second-level thresholds are determined by the processor to be satisfied.

7. In a network gateway coupled to a level N repository having a minimum threshold and a maximum threshold and a level N+1 repository having a minimum threshold and a maximum threshold where N is a non-negative integer, a method for dynamically buffering data units comprising:
    receiving a data unit arriving at a network gateway;
    processing the received data unit according to the minimum and maximum thresholds of the level N repository or the level N+1 repository; and
    allocating storage in the level N repository or the level N+1 repository for the received data unit, wherein the minimum threshold of the level N repository is less than the minimum threshold of the level N+1 repository, and wherein a value of at least one of the minimum threshold of the level N repository and the minimum threshold of the level N+1 repository is dynamically determined according to at least one of a prior system loading, a current system loading, and an expected system loading.

8. The method of claim 7 wherein: the minimum and maximum thresholds of the level N repository or the level N+1 repository are determined dynamically according to a system loading or an availability of the level N or level N+1 repository.

9. The method of claim 7 further comprising the steps of:
    storing in the level N repository or the level N+1 repository the received data unit; and
    retrieving the stored data unit according to a hierarchical schedule.

10. The method of claim 7 wherein:
    the storage in the level N repository or the level N+1 repository is allocated for the received data unit when the minimum and maximum thresholds of the level N repository and the level N+1 repository are acceptable.

11. The method of claim 7 wherein:
    the level N repository and the level N+1 repository are non-hierarchically related.

12. A method for dynamic buffer management to avoid network congestion, the method comprising the steps of:
    coupling to a connection port in a network a hierarchical buffer system comprising a higher-level buffer system and a lower-level buffer system, the hierarchical buffer system receiving one or more data packets or cells from the connection port;
    determining one or more value thresholds for each of the higher-level and lower-level buffer systems representing a resource loading or a storage availability for the higher-level or lower-level buffer system, wherein the one or more value thresholds are dynamically determined according to at least one of a prior system loading, a current system loading, and an expected system loading; and
    storing at least one of the received data packets or cells in the higher-level or lower-level buffer system when the determined value thresholds are acceptable, wherein at least one of the one or more value thresholds for the lower-level buffer system is less than at least one of the one or more value thresholds for the higher-level buffer system.

13. The method of claim 12 wherein:

one or more value threshold is determined to allocate a storage location in the higher-level or lower-level buffer system for one or more received data packets or cells when a buffer length is calculated to be less than a reserved minimum buffer length.

14. The method of claim 12 wherein:

one or more value threshold is determined to allocate a storage location in the higher-level or lower-level buffer system for one or more received data packets or cells when a maximum buffer length ($b_{max\ i}$) is calculated substantially according to the following formula: $b_{max\ i} = b_{min\ i} + \alpha_i F(FB)$ where $b_{min\ i}$ comprises a minimum buffer length, FB comprises a free storage size, $\alpha_i$ comprises a number of non-negative values less than or equal to 1, or F comprises a function for sharing free storage size.

15. The method of claim 12 wherein:

the value thresholds are determined by applying a random early discard (RED) calculation to each higher-level and lower-level buffer system.

16. The method of claim 12 further comprising the steps of:

coupling to the connection port in the network the hierarchical buffer system further comprising a third-level buffer system, the hierarchical buffer system receiving one or more data packets or cells from the connection port;

determining one or more value thresholds representing a resource loading or a storage availability for the third-level buffer system; and storing at least one of the received data packets or cells in the third-level buffer system when the determined value thresholds are acceptable.

17. The method of claim 12 wherein:

any received data packet or cell is stored once in the hierarchical buffer system.

18. The method of claim 12 wherein:

one or more value threshold is determined in dynamic or fixed manner.

19. The method of claim 12 further comprising the steps of:

determining an average queue length value associated with one or more of the received data packet or cell; and applying a random early discard (RED) calculation, wherein if the average queue length value is determined to be between a minimum value and a maximum value, then such received data packet or cell is discarded according to a specified probability, and if the average queue value is determined to be larger than the maximum value, then such received data packet or cell is discarded.

20. The method of claim 12 further comprising the steps of:

determining a queue length value associated with one or more of the received data packet or cell; and applying a queue-protected random early discard (QRED) calculation, wherein if the queue length value associated with the higher-level buffer system is determined to be less than a specific threshold, then the received data packet cell is accepted.

* * * * *

UNITED STATES PATENT AND TRADEMARK OFFICE
CERTIFICATE OF CORRECTION

PATENT NO. : 6,721,796 B1
DATED : April 13, 2004
INVENTOR(S) : Wong

It is certified that error appears in the above-identified patent and that said Letters Patent is hereby corrected as shown below:

Column 7,
Line 52, please replace "firs-level" with -- first level --.

Signed and Sealed this

Sixth Day of July, 2004

JON W. DUDAS
*Acting Director of the United States Patent and Trademark Office*